June 23, 1942.  O. I. OYLER  2,287,637
INTERNAL COMBUSTION ENGINE
Filed Feb. 24, 1941   2 Sheets-Sheet 1
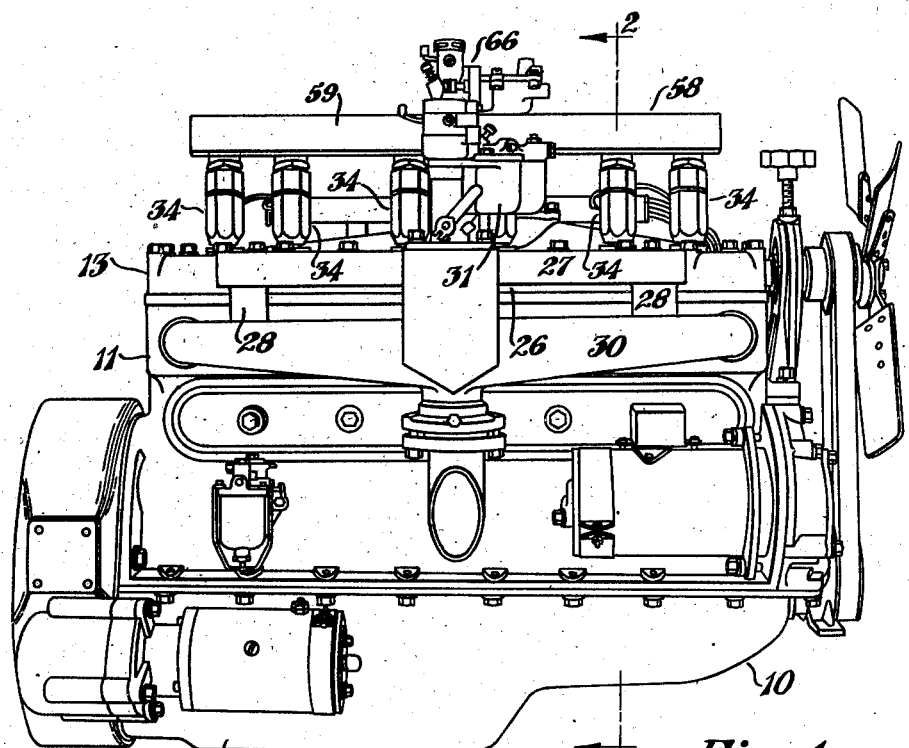
Fig. 1
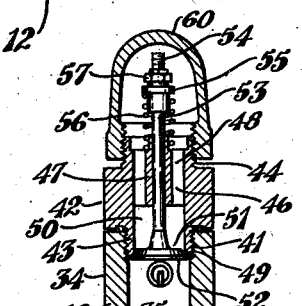
Fig. 3
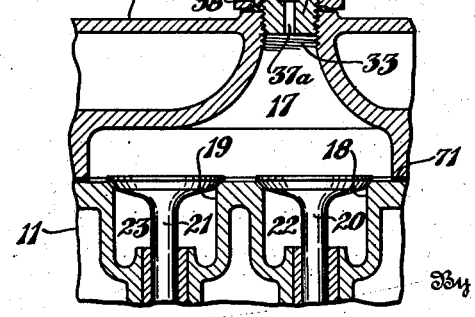
Inventor
Otto I. Oyler
By Frease and Bishop
Attorneys

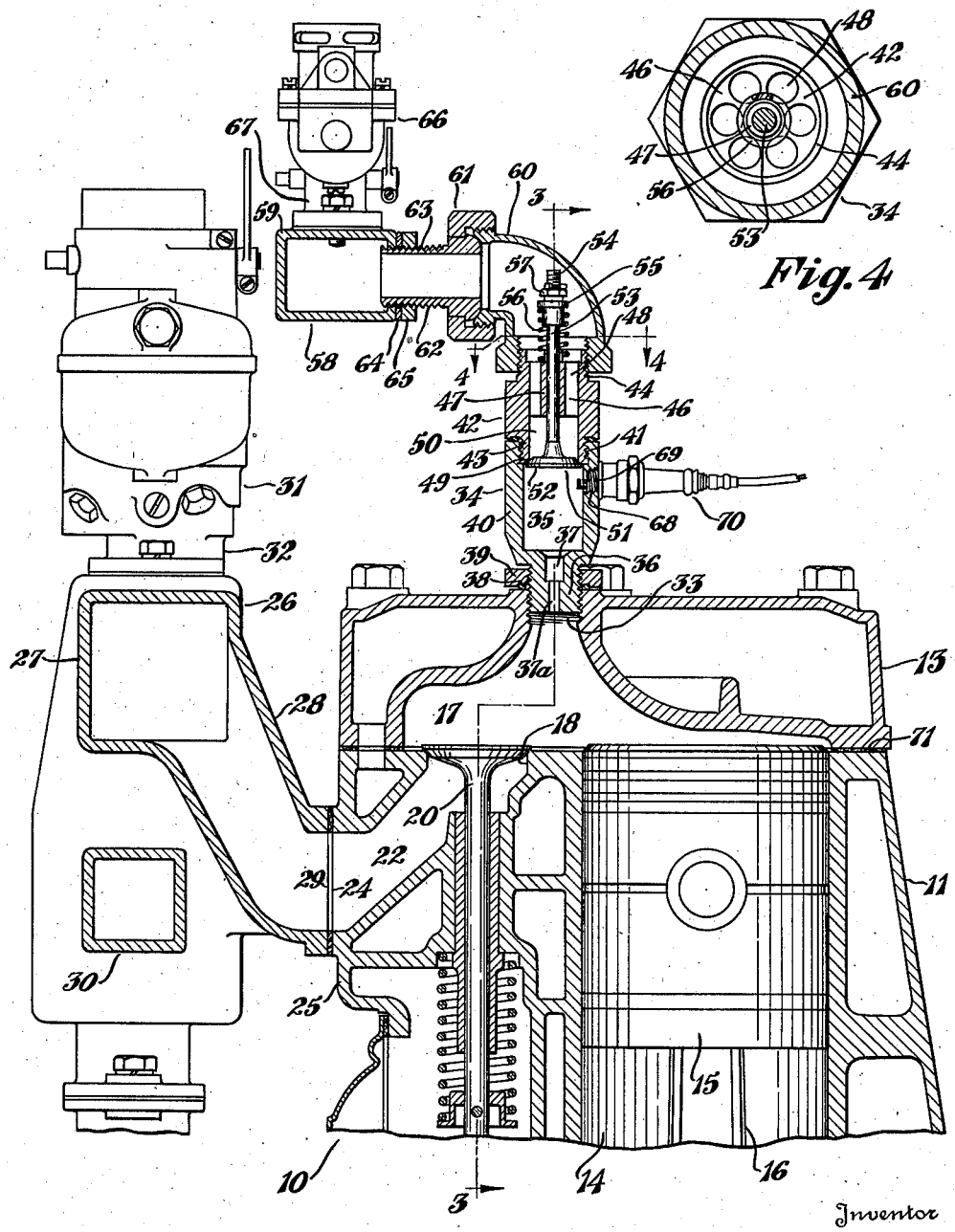

Patented June 23, 1942

2,287,637

UNITED STATES PATENT OFFICE 2,287,637

INTERNAL COMBUSTION ENGINE

Otto I. Oyler, Canton, Ohio

Application February 24, 1941, Serial No. 380,108

6 Claims. (Cl. 123—75)

My invention relates in general to an internal combustion engine adapted to be operated by either volatile, non-volatile, or solid fuel, or a combination of fuels, and more particularly my invention relates to conversion apparatus adapted to convert a usual volatile fuel operated internal combustion engine to an engine adapted for operation by either volatile, non-volatile, or solid fuels, or a combination of the same.

From another standpoint, my invention relates to an internal combustion engine adapted to be operated by non-volatile fuel, such as Diesel oil, without requiring the use of injection nozzles and an injection pump.

In the particular field of highway transport, there were in existence in the United States in 1941 upwards of five million motor trucks, most of which are powered by internal combustion engines which are operated by volatile fuel, principally gasoline.

The Diesel engine, which is also sometimes referred to as a compression ignition internal combustion engine, and which is operated by Diesel oil, that is, an oil which is liquid under usual atmospheric conditions, and which may otherwise be described as non-volatile, has come into limited use in motor trucks for highway transport vehicles, although at the relative price of Diesel oil and gasoline in 1941, substantial economies are effected in motor truck operation when the truck is powered by an engine adapted for using Diesel oil.

Diesel engines, or compression ignition engines, are difficult to start because it requires operation of the pistons in a compression ignition engine to build up a sufficient compression of substantially 500 lbs. per sq. in. to cause ignition of the liquid fuel injected into the usual Diesel engine, and usual electric motor starting apparatus suitable for a gasoline engine has insufficient power to accomplish this.

Consequently, a Diesel engine operating at a 15 to 1 compression ratio requires a heavy duty starting motor and 12 volt storage batteries for the starting motor, as compared with the lighter duty starting motor powered by the usual 6 volt storage battery of a usual gasoline engine.

The difficulty in starting a usual Diesel engine increases as the temperature decreases. In winter weather it is a common sight along highways having heavy motor transport traffic to see Diesel engine powered motor trucks and tractor-trailor units stalled, because of inability to start the Diesel engines after the same have once been stopped either by intention or accident.

Such a Diesel engine stalled because of cold weather can only be started by a rise in temperature which is sometimes effected in a crude manner likely to cause damage to the engine or nearby chassis parts, by the use of blow torches to heat up the walls of the combustion chambers of the engine.

From the standpoint of supplying non-volatile fuel such as Diesel oil to an internal combustion engine and operating the engine by such fuel, it has been almost universally considered essential to utilize oil injection equipment including an injection pump for each engine, and at least one oil injection nozzle for each cylinder.

Such oil injection equipment is very difficult and expensive to manufacture and maintain, and constitutes a substantial part of the initial and maintenance cost of a usual Diesel engine power unit.

The objects of the present invention include the provision of conversion apparatus, whereby a usual internal combustion engine adapted for operation by a volatile fuel such as gasoline may be converted to an engine which may be selectively operated by either a volatile fuel such as gasoline, or a non-volatile or liquid fuel such as Diesel oil, or by solid fuel such as powdered coal, or by a combination or combinations of such fuels.

Further particular objects of the invention include the provision of an internal combustion engine adapted for operation under load by a low cost fuel such as Diesel oil, and which is adapted for being started by a higher cost fuel such as gasoline, and which may also be operated by a mixture of both the low cost fuel and the higher cost fuel.

Further objects of the present invention include the provision of an internal combustion engine adapted for selective and combined fuel operation, and which has a simplified construction adapted for economical production, and for economical operation and maintenance.

Further objects of the present invention include the provision of an internal combustion engine adapted for operation by non-volatile or liquid fuel such as Diesel oil, and which does not necessitate the use of an oil injection pump or oil injection nozzles to supply the liquid fuel to the combustion chambers of the engine.

The foregoing and other objects are attained by the internal combustion engines and conversion apparatus therefor, parts, combinations, and sub-combinations which comprise the present invention and the nature of which is set forth in the following general statement and preferred embodiments of which together with their mode of use are set forth by way of example in the following description and which are particularly and distinctly pointed out and set forth in the appended claims forming part hereof.

The nature of the present invention may be stated in general terms as including in an internal combustion engine and conversion apparatus therefor, all usual parts of an internal combustion engine adapted for operation by a volatile fuel such as gasoline, except the usual spark plug for each cylinder, the bore of each cylinder combining with the top of the piston operating therein and with the underside of the cylinder head wall therefor to form a main combustion and cylinder chamber in one wall of which, preferably the cylinder head wall, there is formed an opening usually internally threaded for connection with a usual spark plug, and an auxiliary combustion chamber plug unit for each cylinder preferably separably connected with the main combustion chamber wall having the opening formed therein and the auxiliary combustion chamber plug unit including generally walls forming an auxiliary combustion chamber communicating through the opening with the main combustion and cylinder chamber.

The auxiliary combustion chamber plug unit for each cylinder preferably includes an externally threaded connector shank which is screwed in the preferably internally threaded opening preferably formed in the cylinder head wall of the main combustion and cylinder chamber.

The auxiliary combustion chamber of each plug unit for each cylinder is communicatingly connected through a suitable manifold with an auxiliary carburetor for the more volatile fuel, the usual engine manifold being communicatingly connected in a usual manner with a carburetor or other means through which a supply of the less volatile fuel is delivered to the engine through usual intake valve means.

Preferably within the auxiliary combustion chamber of each plug unit, auxiliary intake valve means are provided for controlling the delivery of the volatile fuel mixture to the auxiliary combustion chamber.

Preferably in a side wall of the auxiliary combustion chamber plug unit there is operatively mounted a spark plug which preferably is an airplane type spark plug having a connector shank substantially smaller than the connector shank of the auxiliary combustion chamber plug unit which is of the usual size of an automotive spark plug connector shank.

The underside of the usual cylinder head is preferably planed down to provide a higher compression ratio than that in the engine as originally built for operation merely by volatile fuel such as gasoline.

The communication between the auxiliary combustion chamber and the main combustion and cylinder chamber is effected through a restricted opening, preferably formed in the connector shank of the auxiliary combustion chamber plug unit.

I have discovered that the cross sectional area of this restricted opening is critical.

With usual automotive ignition equipment a spark will not appear when the pressure adjacent the sparking points exceeds about 100 lbs. per sq. in. This phenomenon is otherwise described by stating that the spark blows out and is extinguished when the pressure in the chamber where the spark plugs are located exceeds about 100 lbs. per sq. in., which may be termed the spark blow out pressure.

On the other hand when the compression ratio of the improved converted gasoline engine is raised above the usual 5 or 6 to 1 of a usual gasoline engine, for example to 8 to 1, the pressure in the main combustion and cylinder chamber on the compression stroke may be as high as 200 lbs. per sq. in. in a 4" bore by 4¾" stroke engine, and may attain 400 to 500 lbs. per sq. in. in a larger engine.

The present improvements include the provision of a restricted opening between the auxiliary combustion chamber and the main combustion and cylinder chamber, the restricted opening having such area as to limit the flow of gases through the restricted opening into the auxiliary combustion chamber on the compression stroke so that the pressure of the gases in the auxiliary combustion chamber during the compression stroke and until firing never exceeds the spark blow out pressure of substantially 100 lbs. per sq. in.

The invention furthermore includes other improved details and combinations as hereinafter set forth.

By way of example, embodiments of the improved internal combustion engine and conversion apparatus therefor of the present invention are illustrated in the accompanying drawings forming part hereof, in which Figure 1 is a side elevation view of one embodiment of an internal combustion engine including the present improvements;

Fig. 2, a fragmentary enlarged transverse sectional view thereof as on line 2—2, Fig. 1;

Fig. 3, a fragmentary longitudinal sectional view thereof as on line 3—3, Fig. 2; and Fig. 4, a still further enlarged plan sectional view thereof as on line 4—4, Fig. 2;

Similar numerals refer to similar parts throughout the several views.

The improved internal combustion engine indicated generally by 10 includes all parts except usual spark plugs of an engine of usual design originally intended for operation by gasoline fuel or other similar volatile fuel and which has been converted by the present improvements for selective operation particularly in starting by volatile fuel such as gasoline, for combined operation after starting by a mixture of volatile fuel such as gasoline and non-volatile fuel such as Diesel oil, and for further selective operation when desired by non-volatile fuel such as Diesel oil alone.

The engine 10 includes a usual cylinder block 11 at the lower end of which is mounted in a usual manner a crank case 12 and on the upper end of which is mounted in a usual manner a cylinder head 13.

Within and upon the cylinder block and crank case are operatively mounted in a usual manner usual parts of an internal combustion engine some of which are shown in side elevation in Fig. 1, and others of which are shown in Fig. 2, and only those of which will be described in detail, which are pertinent to the present improvements.

The engine 10 as shown is a six cylinder engine, and Fig. 2 illustrates one of the cylinders 14 in the cylinder block 11, and in each cylinder 14 a piston 15 is operatively mounted and connected in a usual manner by a connecting rod 16 with the crank shaft not shown.

For each cylinder 14 the cylinder head 13 has formed in its inner face a main combustion chamber 17 which extends over the upper end of the cylinder 14 and at one side thereof over the upper ends of an intake valve port 18 and an exhaust valve port 19 located in the upper face of the cylinder block, the ports having valve seats formed therein and there being operatively mounted in a usual manner in the cylinder block 11 an intake valve 20 for the port 18 and an exhaust valve 21 for the port 19, the valves being operated in a usual manner from the engine cam shaft not shown.

Walls of the cylinder block form therein for each intake valve port an intake duct 22 and other walls of the cylinder block form for each exhaust valve port an exhaust duct 23, each intake duct 22 extending from its intake valve port 18 at its upper end to a side opening 24 in one side wall 25 of the cylinder block. Each exhaust duct 23 is similarly arranged.

An intake manifold indicated generally by 26 is located adjacent the cylinder block side wall 25 and includes a longitudinally extending tube 27 having delivery branch tubes 28, each branch tube 28 communicating with and extending from the longitudinal tube 27 and connecting and communicating at its lower end opening 29 with the side openings 24 of the intake ducts 22 of side by side cylinders, in a usual manner.

The exhaust duct side openings are similarly communicatingly connected with branch tubes of an exhaust manifold indicated generally by 30 which is associated in a usual manner with the intake manifold 26 for effecting preheating of walls of the intake manifold 26.

Centrally located on the upper face of the longitudinal manifold tube 27 is a carburetor 31 which includes usual carburetor parts, and has a discharge tube 32 communicating through a suitable opening with the interior of the intake manifold longitudinal tube 27.

At the upper end of each combustion chamber 17 in the cylinder head 13, there is provided an upwardly directed internally threaded cylindric opening 33, which as originally designed and used is a spark plug opening in which a usual spark plug has been located before conversion of the usual parts of the engine 10 by the present improvements.

For this conversion, each usual spark plug has been removed from each internally threaded opening 33 and an auxiliary combustion chamber plug unit indicated generally by 34 has been substituted for each usual spark plug.

Each auxiliary combustion chamber plug unit 34 includes generally walls forming an auxiliary combustion chamber 35, and at one end of each unit 34 there is provided an externally threaded connector shank 36 which is screwed in one of the upwardly directed internally threaded openings 33 of the cylinder head 13.

The connector shank 36 has formed therein an axial restricted shouldered opening 37 communicating at one end with the auxiliary combustion chamber 35 and at its other end with the cylinder head main combustion chamber 17.

As shown and preferably a gas sealing washer 38 may be located about the connector shank 36 and upon the upper face of the cylinder head, and may be clamped against the same by an internally threaded nut 39 screwed on the shank 36 on the outside of the cylinder head 13.

As shown, the shank 36 and the side and lower end walls of the auxiliary combustion chamber 35 are formed in a one piece internally shouldered tube 40 having an internally threaded opening 41 at its other end opposite the connector 36.

Each auxiliary combustion chamber plug unit 34, as shown and preferably, includes a valve duct and mounting tube 42 having at one end an externally threaded connector shank 43 screwed in the internally threaded opening 41 of the one piece tube 40, and at the other end an externally threaded connector shank 44.

The valve duct and mounting tube 42 is provided throughout a portion of its length from the end thereof having the connector 44 with a valve mounting web indicated generally by 46 including a central valve stem guide tube 47 surrounded by a plurality of circumferentially spaced valve ducts 48. At the extremity of the connector 43 of the valve duct and mounting tube 42, a conical valve seat 49 is formed and constitutes an inlet port, and between the valve seat 49 and the adjacent inner ends of the circumferentially spaced ducts 48 there is formed a single cylindric duct 50.

A mushroom valve indicated generally by 51 has a conical head 52 arranged for seating and unseating in the valve seat 49, and a stem 53 extends from the head 52 through and slidably fits the interior of the guide tube 47. The valve stem 53 has an externally threaded outer end portion 54. A spring reacting collar 55 is slidable on the valve stem 53 between the threaded outer portion and the outer end of the guide tube 47, and a helical compression valve spring 56 is interposed between the outer end of the guide tube 47 and the collar 55, and an adjusting nut 57 is screwed on the valve stem threaded portion 54 against the outer end of the collar 55 and serves to vary the pressure of the spring 56 for seating the valve head 52.

As clearly shown in Figs. 2 and 3, by the above described construction for each auxiliary combustion chamber plug unit 34, the valve ducts 48 and the valve seat 49 and the valve 51 are opposite the restricted opening 37.

The outer end of each auxiliary combustion chamber plug unit 34 is communicatingly connected with an auxiliary intake manifold indicated generally by 58, which as shown includes a longitudinally extending tube 59.

As shown the connection of each auxiliary combustion chamber plug unit 34 with the auxiliary intake manifold is effected by means of an elbow 60 having one internally threaded end screwed on the externally threaded outer connector shank 44 of the valve duct and mounting tube 42. The other externally threaded end of each elbow 60 is communicatingly connected by a union coupling indicated generally by 61 with one end of a connector tube 62, the other end 63 of which is externally threaded and screwed into an internally threaded aperture in the longitudinal tube 59 of the auxiliary intake manifold 58.

As shown, a sealing washer 64 is located on the threaded end portion 63 of the connector tube 62, and a clamp nut 65 screwed upon the threaded end portion 63 serves to clamp the sealing washer 64 against the adjacent outer face of the auxiliary manifold tube 59.

An auxiliary carburetor indicated generally by 66 including usual carburetor parts is located centrally on the upper face of the auxiliary manifold tube 59 and has a discharge tube 67 communicating through a suitable opening with the interior of the auxiliary intake manifold longitudinal tube 59.

At one side of the tube 40 an internally threaded aperture 68 is provided in which is screwed the externally threaded connector shank 69 of a spark plug indicated generally by 70 which as shown is of an airplane type, and is substantially smaller than a usual automotive type spark plug.

For attaining the desired relatively high compression ratio which may be as high as 8 to 1, for operation of the improved engine 10 by the use of Diesel oil, or a combination of Diesel oil and gasoline, the under face 71 of the cylinder head 13 may be planed down from a level suitable for operation of the engine by gasoline.

This planing may be done in an engine which has been operated for some time by gasoline, in any suitable machine shop.

Where it is desired to quickly obtain large quantities of engines suitable for operation by Diesel oil or a combination of Diesel oil and gasoline, any manufacturing plant already producing usual gasoline engines may modify the usual cylinder heads therefor as by planing down the under sides thereof, and otherwise equipping the engines with the above described conversion apparatus.

Whether the converted engines are originally produced, or produced after some use with gasoline fuel, the engines may be started easily by gasoline, and may be operated after starting either by Diesel oil alone, or by a combination of Diesel oil and gasoline.

The auxiliary carburetor 66 is provided with usual control means shown generally in Fig. 1, and is communicatingly connected with a suitable supply of gasoline or other desired volatile fuel. The carburetor 31 likewise has usual control means shown generally in Fig. 1, and is communicatingly connected with a supply of Diesel oil or other liquid or non-volatile fuel, or solid fuel such as colloidal powdered coal.

Each spark plug 70 is operatively connected in a usual ignition system shown generally in Fig. 1.

The improved converted engine 10 starts and idles on a gasoline-air fuel mixture introduced into each auxiliary combustion chamber 35 where it is ignited by the spark plug 70 therefor.

The ignited gasoline builds up a pressure of some 300 to 500 lbs. per square inch, with a corresponding temperature, and serves to ignite the Diesel oil which is being introduced into the main combustion and cylinder chamber 17 through the intake valve ports 18 by operation of the intake valves 20 in the usual manner.

After the oil operation of the engine commences the gasoline supply may be entirely shut off.

On the other hand, it is sometimes desirable to provide common connections of the butterfly valves of each carburetor 31 and 66 with a throttle, and by providing suitably different capacities for the two carburetors, the engine may be operated by the combined action of the gasoline and oil, as by a ratio of 1 part gasoline to 10 parts of oil.

The volume of the auxiliary combustion chamber 35 may be substantially $\frac{1}{10}$ the size of the total maximum main combustion and cylinder chamber volume.

As stated above, I have discovered that the cross sectional area of the opening communicating between the main combustion and cylinder chamber 17 and the auxiliary combustion chamber 35 is critical.

As shown, this opening is the shouldered opening 37, the lower reduced end portion 37a of which may be termed a restricted control opening or orifice, and controls the flow of gases between the main cylinder and combustion chamber 17 and the auxiliary combustion chamber 35, and vice versa.

The cross sectional area of the restricted control opening 37a must be such as to produce a maximum pressure in the auxiliary combustion chamber 35 of less than the spark plug blow out pressure of about 100 lbs. per sq. in. by the flow of gases upwards through the restricted control opening 37a into the auxiliary combustion chamber 35 from the main combustion and cylinder chamber 17 on the compression stroke of the engine and until firing of the fuel air mixture in the auxiliary combustion chamber 35 by the spark in the auxiliary combustion chamber 35 passing between the sparking points of the spark plug 70.

For an engine with a 4" bore, a 4¾" stroke and a compression ratio of about 8 to 1, and with a maximum pressure in each main combustion and cylinder chamber 17 on the compression stroke of about 200 lbs. per sq. in., I have discovered that a circular cross sectional area of ⅛" diameter is suitable for the restricted control opening 37a.

With this restricted control opening area, definite and certain sparking is always effected in each auxiliary combustion chamber 35, and the improved engine 10 operates with a fuel supply of gasoline or similar volatile fuel delivered through the auxiliary carburetor 66 into each auxiliary combustion chamber 35, and with a supply of non-volatile or liquid fuel such as Diesel oil supplied through a usual carburetor 31 to each main combustion and cylinder chamber through the usual intake valve means, without requiring any injection pump or oil injection nozzles whatever for the liquid fuel.

The improved engine 10 starts easily, even when the temperature is cold enough to prevent the starting of a usual Diesel or oil automotive engine.

The improved engine 10 furthermore may be started by 6 volt storage battery powered starting equipment.

The embodiments of the present improvements illustrated and described herein are by way of example, and the scope of the present invention is not limited to the same or to the particular details thereof, but is commensurate with any and all novel subject matter contained herein which may at any time properly under the United States patent laws be set forth in the claims hereof or originating herein, and the elements of any such claims are intended to include their reasonable functional and structural equivalents.

I claim:

1. In an internal combustion engine, engine walls including a cylinder having a bore and a cylinder head extending over one end of the cylinder bore, a piston operating in the cylinder bore, the cylinder and cylinder head walls and the piston forming therebetween a main combustion and cylinder chamber, one of the engine walls having formed therein an opening, and an auxiliary combustion chamber unit separably connected with the main combustion and cylinder chamber wall having the opening formed therein, the auxiliary combustion chamber unit including walls forming an auxiliary combustion chamber and one of the auxiliary combustion chamber walls extending over the opening in the engine wall and having formed therein a restricted control orifice communicating through the opening between the auxiliary combustion chamber and the main combustion and cylinder chamber, and the auxiliary combustion chamber unit including intake valve means opposite the restricted orifice.

2. In an internal combustion engine, engine walls including a cylinder having a bore and a cylinder head extending over one end of the cylinder bore, a piston operating in the cylinder bore, the cylinder and cylinder head walls and the piston forming therebetween a main combustion and cylinder chamber, one of the engine walls having formed therein an opening, and an auxiliary combustion chamber unit separably connected with the main combustion and cylinder chamber wall having the opening formed therein, the auxiliary combustion chamber unit including walls forming an auxiliary combustion chamber and one of the auxiliary combustion chamber walls extending over the opening in the engine wall and having formed therein a restricted control orifice communicating through the opening between the auxiliary combustion chamber and the main combustion and cylinder chamber, and the auxiliary combustion chamber unit including intake valve means opposite the restricted orifice and means for supplying one fuel-air mixture to the main combustion and cylinder chamber, and means for supplying another spark ignitable fuel-air mixture to the auxiliary combustion chamber through the intake valve means, and spark ignition means operative in the auxiliary combustion chamber.

3. In an auxiliary combustion chamber unit for separable association in an internal combustion engine and the like with a main combustion chamber wall having an opening formed therein, walls forming an auxiliary combustion chamber and an intake port communicating with the auxiliary combustion chamber and a restricted control orifice opposite the intake port communicating with the auxiliary combustion chamber, and sealing connector means adapted for separably connecting the unit with the main combustion chamber wall at the opening formed therein, the restricted control orifice extending through the connector means and being registerable with the opening in the main combustion chamber wall.

4. In an auxiliary combustion chamber unit for separable association in an internal combustion engine and the like with a main combustion chamber wall having an opening formed therein, walls forming an auxiliary combustion chamber and an intake port communicating with the auxiliary combustion chamber and a restricted control orifice intake opposite the port communicating with the auxiliary combustion chamber, and sealing connector means adapted for separably connecting the unit with the main combustion chamber wall at the opening formed therein, the restricted control orifice extending through the connector means and being registerable with the opening in the main combustion chamber wall, and spark ignition means for the unit including sparking points located in the auxiliary combustion chamber.

5. In an auxiliary combustion chamber unit for separable association in an internal combustion engine and the like with a main combustion chamber wall having an opening formed therein, walls forming an auxiliary combustion chamber and an intake port communicating with the auxiliary combustion chamber and a restricted control orifice opposite the intake port communicating with the auxiliary combustion chamber, and sealing connector means adapted for separably connecting the unit with the main combustion chamber wall at the opening formed therein, the restricted control orifice extending through the connector means and being registerable with the opening in the main combustion chamber wall, and intake valve means for the intake port of the unit.

6. In an auxiliary combustion chamber unit for separable association in an internal combustion engine and the like with a main combustion chamber wall having an opening formed therein, walls forming an auxiliary combustion chamber and an intake port communicating with the auxiliary combustion chamber and a restricted control orifice opposite the intake port communicating with the auxiliary combustion chamber, and sealing connector means adapted for separably connecting the unit with the main combustion chamber wall at the opening formed therein, the restricted control orifice extending through the connector means and being registerable with the opening in the main combustion chamber wall, and spark ignition means for the unit including sparking points located in the auxiliary combustion chamber, and intake valve means for the intake port of the unit.

OTTO I. OYLER.